United States Patent
Kirsch et al.

(10) Patent No.: US 10,152,493 B1
(45) Date of Patent: Dec. 11, 2018

(54) DYNAMIC EPHEMERAL POINT-IN-TIME SNAPSHOTS FOR CONSISTENT READS TO HDFS CLIENTS

(71) Applicant: EMC Corporation, Hopkinton, MA (US)

(72) Inventors: Nick Kirsch, Seattle, WA (US); Steve Hubbell, Seattle, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 431 days.

(21) Appl. No.: 14/755,130

(22) Filed: Jun. 30, 2015

(51) Int. Cl.
  *G06F 17/30* (2006.01)
  *H04L 29/06* (2006.01)
(52) U.S. Cl.
  CPC .. *G06F 17/30238* (2013.01); *G06F 17/30088* (2013.01); *G06F 17/30212* (2013.01); *H04L 67/42* (2013.01)
(58) Field of Classification Search
  CPC ......... G06F 17/30088; G06F 17/30203; G06F 17/30312; G06F 17/302; G06F 17/30212
  See application file for complete search history.

(56) References Cited

U.S. PATENT DOCUMENTS 9,223,845 B2* 12/2015 Horn ................ G06F 3/0688
9,336,219 B2*  5/2016 Makkar ........... G06F 17/30088
9,495,381 B2* 11/2016 Shvachko ........ G06F 17/30174

OTHER PUBLICATIONS

U.S. Appl. No. 14/755,142, filed Jun. 30, 2015, 19 pages.

* cited by examiner

Primary Examiner — Cheryl Lewis
(74) Attorney, Agent, or Firm — Krishnendu Gupta

(57) ABSTRACT

Implementations are provided herein for dynamic ephemeral point-in-time snapshots being taken upon read requests from clients associated with object protocols and/or other protocols that depend on a consistent read. In response to receiving a read request from a protocol that depends on a consistent read, a point-in-time snapshot can be taken on the read target that maintains the durability of the point-in-time snapshot, in memory, until the client no longer requires access to the file. It can be appreciated that prior to taking the snapshot, in contemporaneously with taking the snapshot, or after the snapshot is taken, a Network File System ("NFS") client, a Sever Message Block ("SMB") client, or other clients of network protocols that allow for modifications and overwrites of file data, can open and modify the file that is the basis of the point-in-time snapshot, without repercussion to the object protocol that is using the point-in-time snapshot version of the file for a consistent read view. After the point-in-time snapshot has been used for the consistent read, the snapshot can in some implementations be discarded or in other implementations be maintained for a second purpose.

18 Claims, 7 Drawing Sheets

DYNAMIC EPHEMERAL POINT-IN-TIME SNAPSHOTS FOR CONSISTENT READS TO HDFS CLIENTS

FIELD OF THE INVENTION

This invention relates generally to data consistency in a multi-protocol environment, and more particularly to systems and methods for establishing and using dynamic ephemeral point-in-time snapshots for consistent reads to Hadoop Distributed File System clients.

BACKGROUND OF THE INVENTION

Distributed file systems offer many compelling advantages in establishing high performance computing environments. One example is the ability to easily expand, even at large scale. Another example is the ability to support multiple unique network protocols. For example, a cluster of nodes operating together to function as a distributed file system can support connections from clients using different network protocols. One storage client can access the distributed file system using the Network File System ("NFS") protocol, a second using the Server Message Block ("SMB") protocol, and the third using the Hadoop Distributed File System ("HDFS") protocol. Not only can different clients access the distributed file system under different protocols, multiple clients of a single protocol can also access the distributed file system.

With multiple clients connecting to a single distributed file system objects, files or directories that exist within the file system may be accessed by more than one client using more than one protocol. However, different protocols have different rules and different processes for how they interact with data residing in the file system. For example, clients using the SMB/NFS protocols can open a file, modify the contents of the file, and save the changes to the file. While some data protection processes (e.g., copy-on-write snapshots or other backup processes) may be in place in the file system that act to preserve the original file for clients to access, these protocols themselves allow data to be overwritten.

This is in contrast to protocols like HDFS that are append only for new writes. For example, after an HDFS client reads a file, if it wishes to make changes to the file and save the changes, the changes are stored separately as new data block(s) and the changes are appended into the file system allowing clients access to the newly modified version through some combination of the original and appended data as well as the original version of the data through the original data blocks that the protocol does not write over. Another object based protocol, for example, Open Stack Swift, provides for explicit versioning of objects, such that a change to any object creates a new object as the next version of the original object, where the original version is still retained by the file system.

Therefore there exists a need to honor the semantics of the underlying protocols in a multi-protocol environment, such that a plurality of network protocols can all work together in one name space, while retaining as much discriminative information associated with individual protocols to make the client experience transparent to other protocols that are accessing the same data.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a distributed file system can be maintained on a cluster of nodes, wherein the distributed file system is accessible by clients using a plurality of network protocols. A read request can be received from a client using the Hadoop Distributed File System ("HDFS") protocol wherein the read request is associated with a read target. In response to receiving the read request, a point-in-time snapshot of the read target can be dynamically generated, wherein the point-in-time snapshot is associated with a set of pseudo DataNode locations and wherein the set of pseudo DataNode locations are associated with a set of block location addresses within the distributed file system. The set of pseudo DataNode locations associated with the point-in-time snapshot can be sent to the client.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
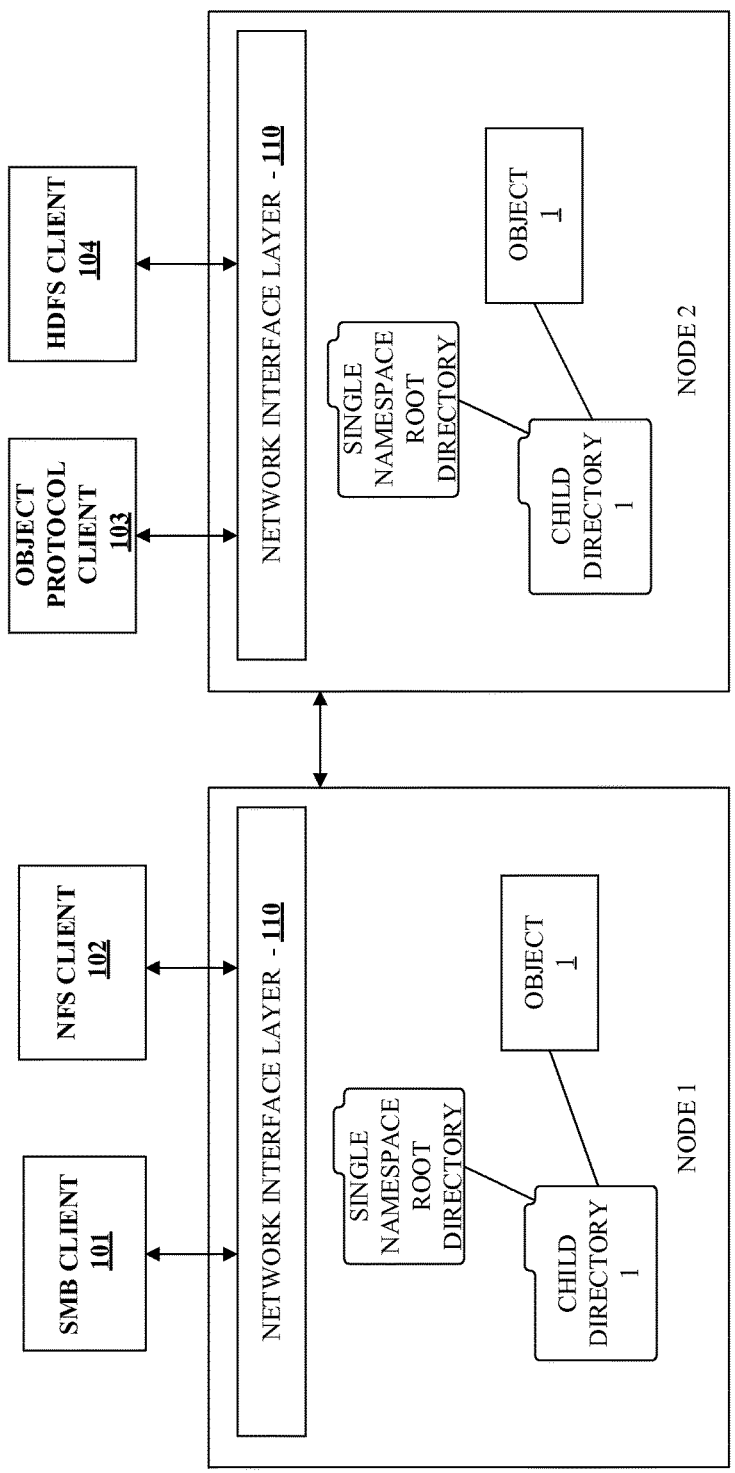
FIG. 1 illustrates an example of two nodes among a cluster of nodes with example clients connecting to the nodes.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

The term "Access Zone" as used within this specification refers to a form of multi-tenancy that effectively partitions a single file system into trees that can act like distinct separate file systems to connected clients. Different access zones can have separate overlapping root directories, and can be affiliated with a distinct protocol. It can be appreciated that an admin access zone can be established for the root directory of the entire file system that can encompass all other access zones of the file system. Access zones can be associated with a set of unique IP addresses whereby clients connecting to the file system can be assigned an access zone based on the IP address of their connection. Access zones can be configurable to establish customizable authentication procedures, backup and recovery settings, data services, etc.

The term "inode," as used herein refers to data structures that may store information, or meta-data, about files and folders, such as size, file ownership, access mode (read, write, execute permissions), time and date of creation and modification, file type, or the like. In at least one of the various embodiments, inode data structures may contain one or more references or pointer to the actual data blocks of the contents stored in the file. In at least one of the various embodiments, inodes may be in a known location in a file system. From an inode, a reader or writer may access the contents of the inode and the contents of the file. Some file systems implement inodes using a data structure called an inode. In at least one of the various embodiments, a data structure explicitly named "inode" may be absent, but file systems may have data structures that store data similar to inodes and may provide capabilities similar to inodes as described herein. Also, in at least one of the various embodiments, the inode data may be referred to as stat data, in reference to the stat system call that provides the data to processes.

As used herein, the term "node" refers to a physical computing device, including, but not limited to, network devices, servers, processors, cloud architectures, or the like. A node may also include virtual machines, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

The term "cluster of nodes" refers to one or more nodes that operate together to form a distributed file system. In one example, a cluster of nodes forms a unified namespace for a distributed file system. Nodes within a cluster may communicate information about nodes within the cluster to other nodes in the cluster. Nodes among the cluster of nodes function using the same logical inode "LIN" mappings that describe the physical location of the data stored within the file system. Clients can connect to any one node among the cluster of nodes and access data stored within the cluster. For example, if a client is connected to a node, and that client requests data that is not stored locally within the node, the node can then load the requested data from other nodes of the cluster in order to fulfill the request of the client. Data protection plans can exist that stores copies or instances of file system data striped across multiple drives in a single node and/or multiple nodes among the cluster of nodes, thereby preventing failures of a node or a storage drive from disrupting access to data by the clients. Metadata, such as inodes, for an entire distributed file system can be mirrored and/or synched across all nodes of the cluster of nodes. Implementations herein also refer to clusters of nodes being in contact with differing cluster of nodes. It can be appreciated that separate clusters of nodes are responsible for separate namespaces and have differing inode data, even if the clusters store the same data.

This specification incorporates by reference in full application Ser. No. 14/587,654 filed on Dec. 31, 2014, titled "IMPROVING THE PERFORMANCE OF HADOOP DISTRIBUTED FILE SYSTEM OPERATIONS IN A NON-NATIVE OPERATING SYSTEM."

Implementations are provided herein for dynamic ephemeral point-in-time snapshots being taken upon read requests from clients associated with object protocols and/or other protocols that depend on a consistent read. In response to receiving a read request from a protocol that depends on a consistent read, a point-in-time snapshot can be taken on the read target that maintains the durability of the point-in-time snapshot, in memory, until the client no longer requires access to the file. It can be appreciated that prior to taking the snapshot, in contemporaneously with taking the snapshot, or after the snapshot is taken, a Network File System ("NFS") client, a Sever Message Block ("SMB") client, or other clients of network protocols that allow for modifications and overwrites of file data, can open and modify the file that is the basis of the point-in-time snapshot, without repercussion to the object protocol that is using the point-in-time snapshot version of the file for a consistent read view. After the point-in-time snapshot has been used for the consistent read, the snapshot can in some implementations be discarded or in other implementations be maintained for a second purpose.

Referring now to FIG. 1, there is illustrated an example of two nodes among a cluster of nodes with example clients connecting to the nodes. It can be appreciated that Nodes and a Cluster of Nodes are modeled in more detail and explained below with regards to FIGS. 6-7. Both depicted nodes (Node 1 and Node 2) are part of the same cluster.

Each node has a network interface layer 110 that is capable of sending and receiving data to clients using a plurality of network protocols. Example clients can include a SMB client 101, a NFS client 102, an Object Protocol Client 103 (e.g., REST, S3, Cloud Data Management Interface ("CDMI"), etc.), and a Hadoop Distributed File System ("HDFS") client 104. It can be appreciated that these are just examples of some of the many applicable protocols.

It can be appreciated that multiple clients can exist for a given network protocol. It can be further appreciated that clients can connect to any node among the cluster of nodes. For example, multiple SMB clients can connect to the cluster of nodes, including one or more connected to Node 1 and one or more also connected to Node 2.

It can also be appreciated that Node 1, Node 2, and any Node among the Cluster of Nodes can be in communication with each other. Thus, a distributed metadata layer can exist within each node that tracks the block addresses and storage device identifiers for data stored throughout the distributed file system. As depicted, the Cluster of Nodes can have a single common namespace that exists across each node of the cluster of nodes. Thus, SMB clients and HDFS clients can share the same single namespace.

For example, in FIG. 1, both the SMB client 101 and the HDFS Client 106 may serve a request through network interface layers 110 of any node among the cluster of nodes to access Object 1, a descendent of Child Directory 1 (a descendant of the single namespace root directory). However, differing protocols have different means for how they interact with objects/files. For example, the NFS and SMB protocols allow a client to access the contents of an object/file, modify the data, and write over the previous contents of the file. While certain techniques such as copy-on-write snapshots can preserve the previous version of the data, the NFS and SMB protocols do allow clients to modify the data within an object/file without necessarily preserving the previous version. It can be appreciated that other protocols, such as HDFS, are append only, in that to modify any portion of a file or object that is already written, the data must be rewritten to a new object and/or file, and the pointers associated with the object/file can be updated to point to the newly written version of the object/file while the original version of the data is still retained in the file system. Thus, in honoring the underlying assumptions of conflicting protocols, NFS and SMB clients can modify and write over existing files/objects, while HDFS and Open Stack Swift and other object protocols assume that data is never written over, and past versions of all modified data are retained within the file system.

In another example of protocol differences, HDFS clients assume that data that has been committed will not change, and thus depends on a consistent view of the data upon receiving and honoring client read requests. In sending a read request to the NameNode, an HDFS client receives back from the NameNode a set of DataNode locations that hold copies of the blocks associated with the read target. The data blocks associated with the read target are assumed to be immutable, thus granting access to the client to load portions of the data over time is viable using the HDFS protocol. However, if NFS and SMB clients are accessing the same data blocks and writing over the data while the HDFS client expects a consistent view of the data for its client when honoring a read request, conflicts can arise.

FIG. 2-5 illustrate methods and/or flow diagrams in accordance with this disclosure. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Figure 2:
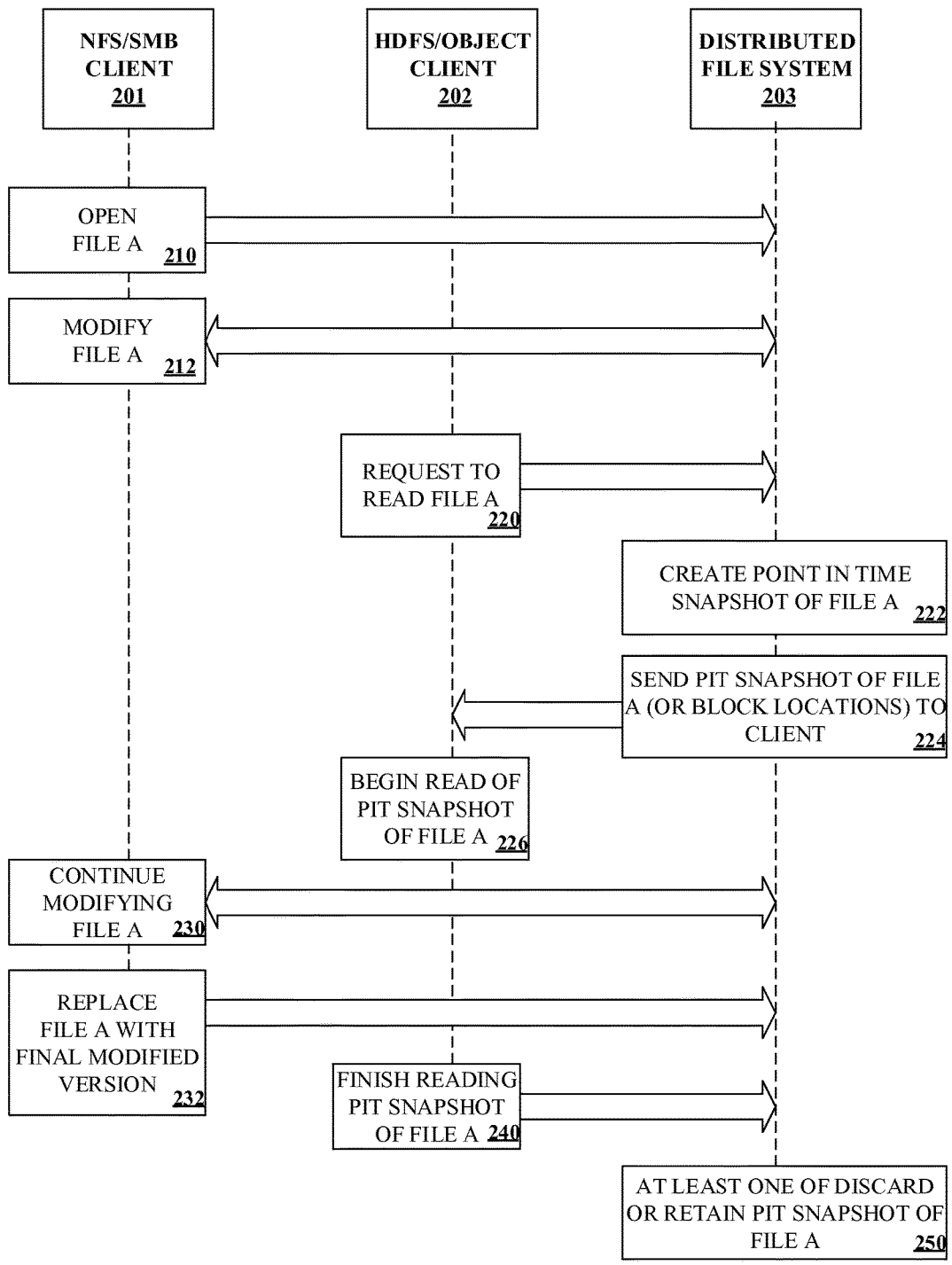
FIG. 2 illustrates an example method for using dynamic ephemeral point-in-time snapshots for establishing a consistent read view for an object based protocol client while a file based protocol client is currently modifying the object in accordance with implementations of this disclosure.

FIG. 2 illustrates an example method for using dynamic ephemeral point-in-time snapshots for establishing a consistent read view for an object based protocol client while a file based protocol client is currently modifying the object in accordance with implementations of this disclosure. The method flows vertically down, showing a series of actions taken by NFS/SMB client 201, HDFS/Object client 202, and Distributed File System 203. It can be appreciated that in one implementation, Distributed File System 203 is a Cluster of Nodes, and NFS/SMB Client 201, HDFS/Object Client 202 can connect to and request/perform the depicted actions with any individual node among the cluster of nodes. It can be appreciated that NFS/SMB Client 201 can connect a different node in the same cluster of nodes than HDFS/Object client 202 while the steps depicted in FIG. 2 are performed.

At 210, an NFS, SMB, or other File Based protocol that supports modification and overwriting existing files can open File A. At 212, the NFS/SMB Client 201 can begin to modify the file, periodically saving the modifications and overwriting File A on Distributed File System 203.

At 220, HDFS/Object Client 202 can make a request to read file A. It can be appreciated that the HDFS/Object Client 202 expects a consistent view for the read. At 222, a point-in-time snapshot of File A can be taken that includes the modifications made and overwritten as of step 212 described above. At 224, the point-in-time snapshot of file A can be sent to the HDFS/Object Client 202 from Distributed File System 203. It can be appreciated that the process for delivering the data to HDFS/Object client 202 may be dependent on the protocol. For example, an HDFS client that makes a read request expects a set of DataNode locations where it can retrieve the data blocks necessary to create File A on the client. In another example, an Open Stack Swift object client sends read requests to the host and expects a copy of the file to be sent back to the client. At 226, no matter how the protocol HDFS/Object client 202 is using to connect to distributed file system 203, it can begin reading the point-in-time snapshot of File A created at step 222.

At 230, the NFS/SMB client 201 can continue modifying File A. It can be appreciated the modifications can continue at any point after the point-in-time snapshot of File A is created at 222. At 232, NFS/SMB client 201 can replace (e.g., overwrite) the contents of File A on distributed File System 203 with a final modified version for this session. At 240, the HDFS/Object client 202 can finish its read of the point-in-time snapshot of file A.

At 250, the ephemeral nature of the point-in-time snapshot can be realized as the point-in-time snapshot can be discarded (e.g., the memory locations associated with the data can be freed for other use). In other implementation, the point-in-time snapshot can be retained. For example, an HDFS or Object client may desire to retain all point-in-time snapshots created to honor its read requests in order to review the data in the same state at a later time.

Figure 3:
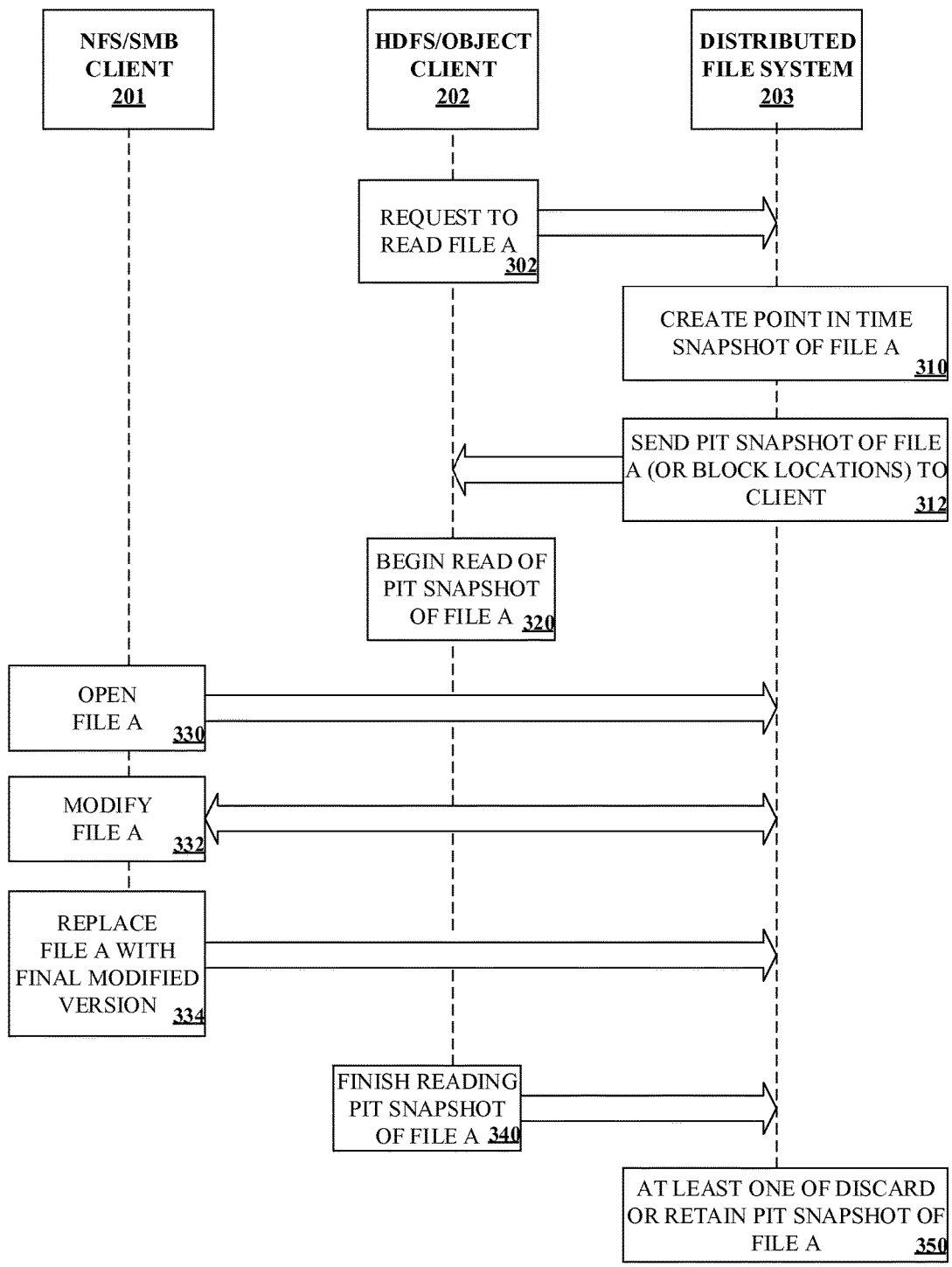
FIG. 3 illustrates an example method for using dynamic ephemeral point-in-time snapshots for establishing a consistent read view for an object based protocol client while a file based protocol client begins modifying the object after the object based protocol has begun reading the snapped object in accordance with implementations of this disclosure.

FIG. 3 illustrates an example method for using dynamic ephemeral point-in-time snapshots for establishing a consistent read view for an object based protocol client while a file based protocol client begins modifying the object after the object based protocol has begun reading the snapped object in accordance with implementations of this disclosure. Similar to FIG. 2 as discussed above, the method flows vertically down, showing a series of actions taken by NFS/SMB client 201, HDFS/Object client 202, and Distributed File System 203.

At 302, HDFS/Object Client 202 can make a request to read file A. It can be appreciated that the HDFS/Object Client 202 expects a consistent view for the read. At 310, a point-in-time snapshot of File A can be taken. At 312, the point-in-time snapshot of file A can be sent to the HDFS/Object Client 202 from Distributed File System 203. At 320, the HDFS/Object client 202 can begin reading the point-in-time snapshot of File A created at step 310.

At 330, NFS/SMB client 201 can open File A. At 332, the NFS/SMB client 201 can modify File A, repeatedly churn File A, overwrite File A, etc. without affecting the state of the point-in-time snapshot of File A generated at 310. At 334, the final modified version of File A can replaced (e.g., overwritten) within the distributed file system 203. At 340, the HDFS/Object client 202 can finish its read of the point-in-time snapshot of file A.

Figure 4:
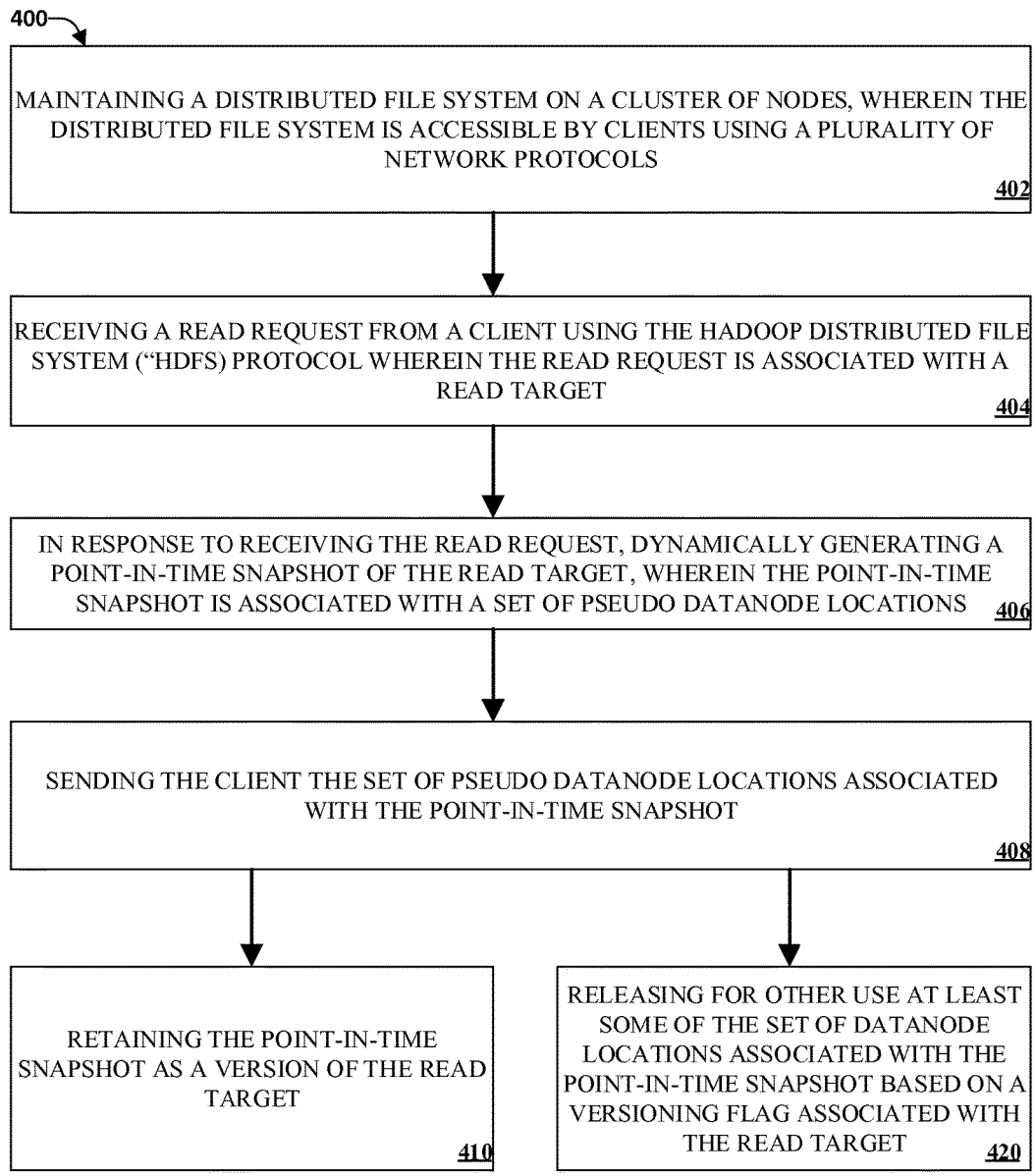
FIG. 4 illustrates an example method for using dynamic ephemeral point-in-time snapshots to honor read requests from HDFS clients in accordance with implementations of this disclosure.

At 350, the ephemeral nature of the point-in-time snapshot can be realized as the point-in-time snapshot can be discarded (e.g., the memory locations associated with the data can be freed for other use). In other implementation, the point-in-time snapshot can be retained. For example, an HDFS or Object client may desire to retain all point-in-time snapshots created to honor its read requests in order to review the data in the same state at a later time FIG. 4 illustrates an example method for using dynamic ephemeral point-in-time snapshots to honor read requests from HDFS clients in accordance with implementations of this disclosure. At 400, a distributed file system can be maintained on a cluster of nodes, wherein the distributed file system is accessible by clients using a plurality of network protocols.

At 402, a read request can be received from a client using the HDFS protocol wherein the read request is associated with a read target.

At 404, in response to receiving the read request, a point-in-time snapshot of the read target can be dynamically generated, wherein the point-in-time snapshot is associated with a set of pseudo DataNode locations and wherein the set of pseudo DataNode locations are associated with a set of block location addresses within the distributed file system. In one implementation, dynamically generating the point-in-time snapshot occurs while a NFS client is accessing and modifying the read target. In one implementation, the NFS client is accessing the cluster of nodes from a different node than the client. In one implementation, dynamically generating the point-in-time snapshot occurs while a SMB client is accessing and modifying the read target.

It can be appreciated that the snapshot can be generated by copying data into memory of one of one of the nodes, preventing the data existing at the time the snapshot is generated from being overwritten by a second client. It can be further appreciated that other known methods for copying and preserving point-in-time file data can be used to establish the snapshot.

It can be appreciated that pseudo blocks as more fully described in the incorporation by reference above, can allow a non-native HDFS to serve read requests to HDFS clients to any node within the cluster of nodes, as all nodes within the cluster of nodes have access to the entire dataset of the distributed file system. For example, while an individual node may not host the entire dataset, they can request data blocks from other nodes within the cluster of nodes transparent to the client.

At 406, the client can be sent the set of pseudo DataNode locations associated with the point-in-time snapshot.

In one implementation, at 410, the point-in-time snapshot can be retained as a version of the read target. For example, a flag associated with the file can be set to retain all historical versions of a file, including a version created based on a read request by an object client. As discussed above, object file systems with append only writing structures or versioning structures that retain every version of data may create a client expectation that all previously viewed versions of a file (e.g., a point-in-time snapshot generated in response to a read request) may be available at a later time.

In one implementation, at 420, at least some of the set of DataNode locations associated with the point-in-time snapshot can be released for other use based on a versioning flag associated with the read target. For example, as stated above, the flag can indicate whether all historical versions of a file are retained, whether point-in-time snapshots related to read requests from an object client are retained, or whether no historical versions are retained.

Figure 5:
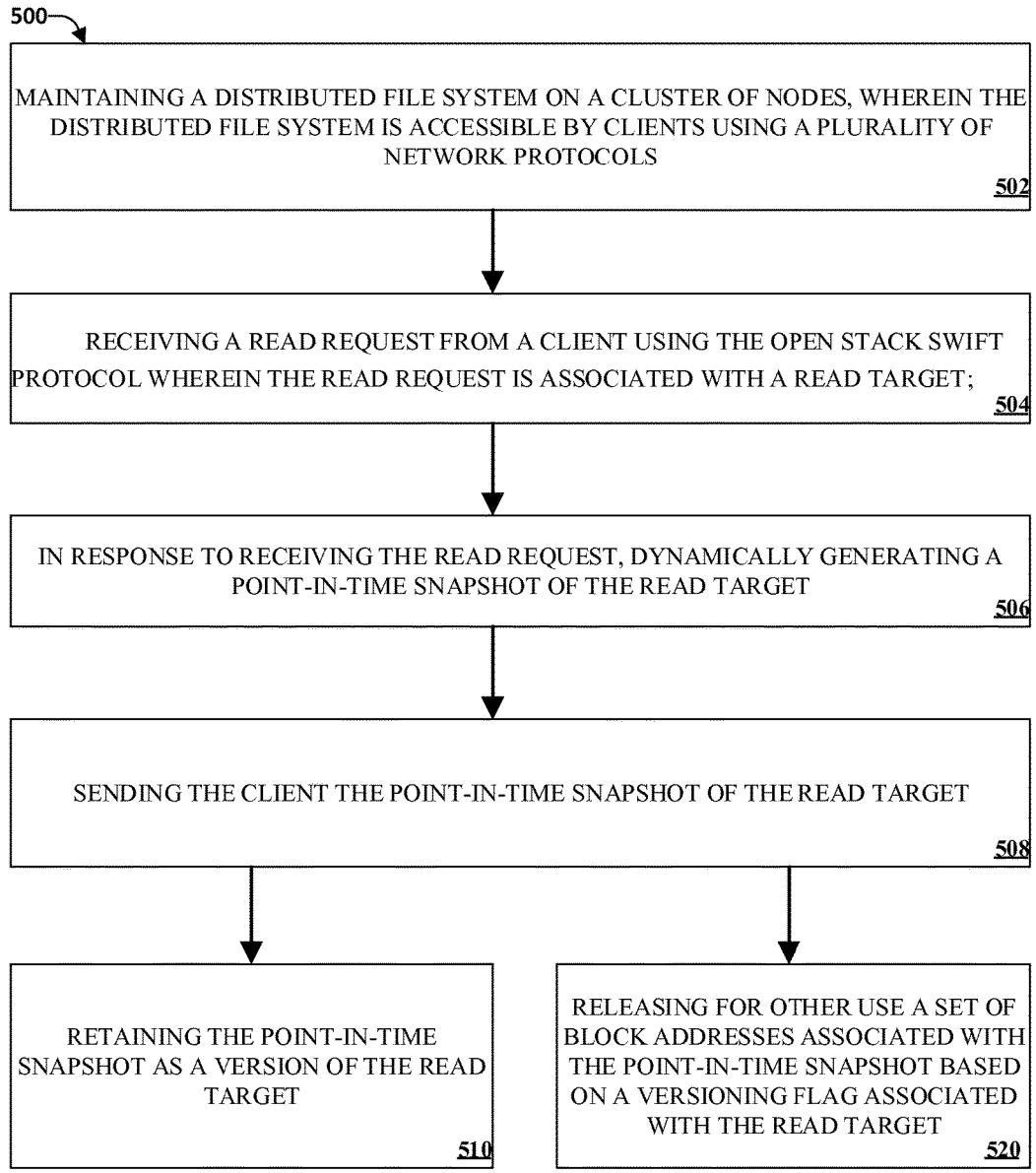
FIG. 5 illustrates an example method for using dynamic ephemeral point-in-time snapshots to honor read requests from Open Stack Swift clients in accordance with implementations of this disclosure.

FIG. 5 illustrates an example method for using dynamic ephemeral point-in-time snapshots to honor read requests from Open Stack Swift clients in accordance with implementations of this disclosure. At 400, a distributed file system can be maintained on a cluster of nodes, wherein the distributed file system is accessible by clients using a plurality of network protocols.

At 502, a read request can be received from a client using the Open Stack Swift protocol wherein the read request is associated with a read target.

At 504, in response to receiving the read request, a point-in-time snapshot of the read target can be dynamically generated.

At 506, the client can be sent the point-in-time snapshot of the read target.

In one implementation, at 510, the point-in-time snapshot can be retained as a version of the read target.

In one implementation, at 520, at least some of the set of DataNode locations associated with the point-in-time snapshot can be released for other use based on a versioning flag associated with the read target.

Figure 6:
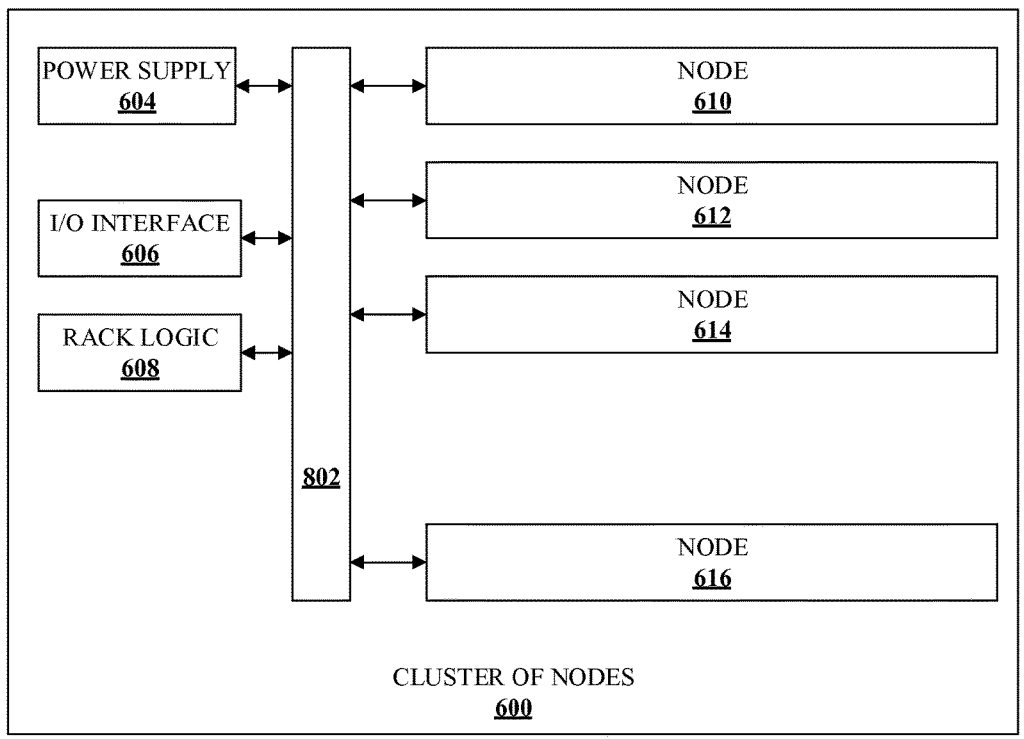
FIG. 6 illustrates an example block diagram of rack of a cluster of nodes in accordance with implementations of this disclosure.

FIG. 6 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, cluster of nodes typically includes several computers that merely require a network connection and a power cord connection to operate. Each node computer often includes redundant components for power and interfaces. The cluster of nodes 500 as depicted shows Nodes 610, 612, 614 and 616 operating in a cluster; however, it can be appreciated that more or less nodes can make up a cluster. It can be further appreciated that nodes among the cluster of nodes do not have to be in a same enclosure as shown for ease of explanation in FIG. 6, and can be geographically disparate. Backplane 602 can be any type of commercially available networking infrastructure that allows nodes among the cluster of nodes to communicate amongst each other in as close to real time as the networking infrastructure allows. It can be appreciated that the backplane 602 can also have a separate power supply, logic, I/O, etc. as necessary to support communication amongst nodes of the cluster of nodes.

As shown in the figure, enclosure 600 contains at least a power supply 604, an input/output interface 606, rack logic 608, several nodes 610, 612, 614, and 616, and backplane 602. Power supply 604 provides power to each component and nodes within the enclosure. The input/output interface 606 provides internal and external communication for components and nodes within the enclosure. Backplane 608 can enable passive and active communication of power, logic, input signals, and output signals for each node.

It can be appreciated that the Cluster of nodes 600 can be in communication with a second Cluster of Nodes as described in the subject disclosure and work in conjunction to provide at least the implementations as disclosed herein.

Nodes can refer to a physical enclosure with a varying amount of CPU cores, random access memory, flash drive storage, magnetic drive storage, etc. For example, a single Node could contain, in one example, 36 disk drive bays with attached disk storage in each bay. It can be appreciated that nodes within the cluster of nodes can have varying configurations and need not be uniform.

Figure 7:
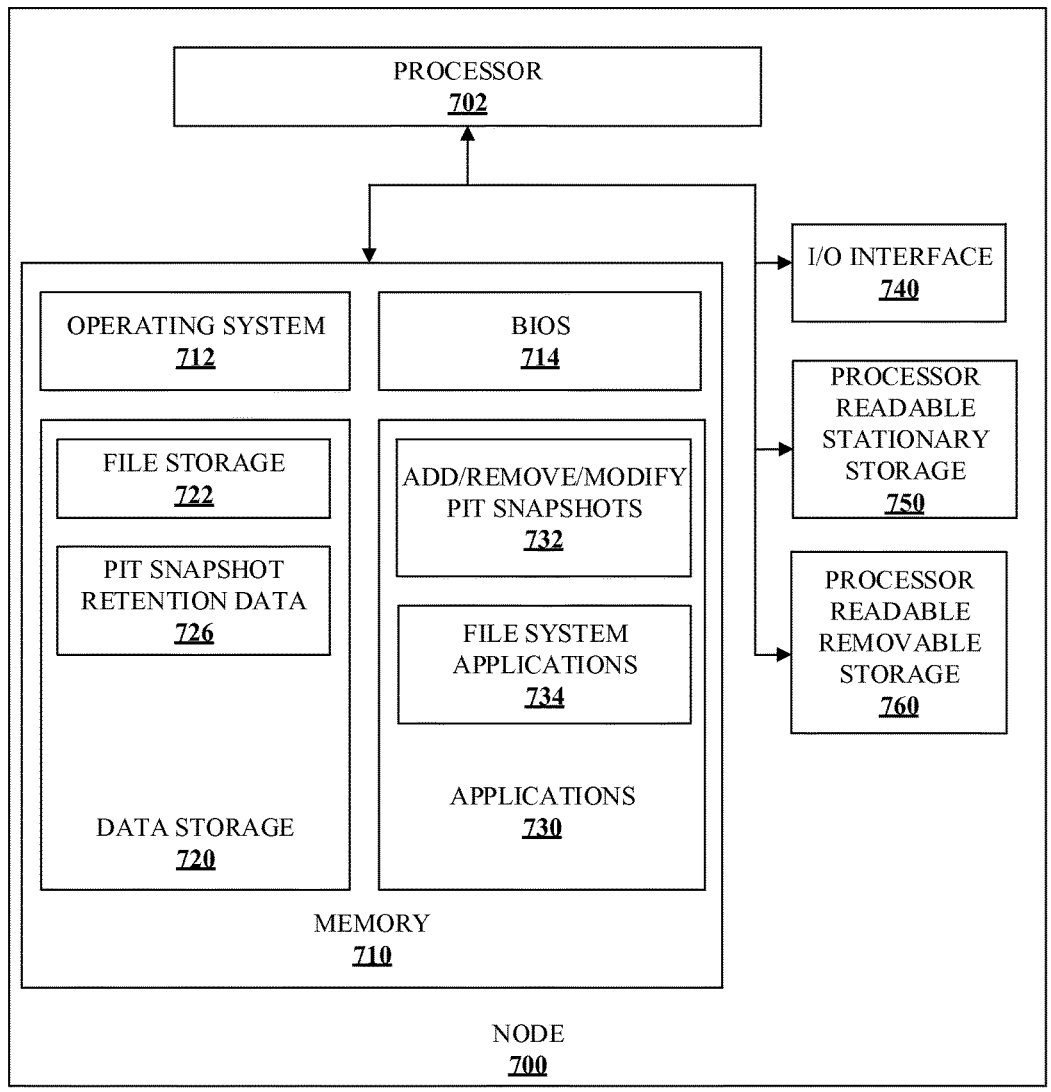
FIG. 7 illustrates an example block diagram of a node in accordance with implementations of this disclosure.

FIG. 7 illustrates an example block diagram of a node 700 in accordance with implementations of this disclosure. As shown in FIG. 6, a plurality of nodes may be included in one enclosure that shares resources provided by the enclosure to reduce size, power, and cost.

Node 700 includes processor 702 which communicates with memory 710 via a bus. Node 700 also includes input/output interface 740, processor-readable stationary storage device(s) 750, and processor-readable removable storage device(s) 760. Input/output interface 740 can enable node 700 to communicate with other nodes, mobile devices, network devices, and the like. Processor-readable stationary storage device 750 may include one or more devices such as an electromagnetic storage device (hard disk), solid state hard disk (SSD), hybrid of both an SSD and a hard disk, and the like. In some configurations, a node may include many storage devices. Also, processor-readable removable storage device 760 enables processor 702 to read non-transitive storage media for storing and accessing processor-readable instructions, modules, data structures, and other forms of data. The non-transitive storage media may include Flash drives, tape media, floppy media, disc media, and the like.

Memory 710 may include Random Access Memory (RAM), Read-Only Memory (ROM), hybrid of RAM and ROM, and the like. As shown, memory 710 includes operating system 712 and basic input/output system (BIOS) 714 for enabling the operation of node 700. In various embodiments, a general-purpose operating system may be employed such as a version of UNIX, LINUX™, a specialized server operating system such as Microsoft's Windows Server™ and Apple Computer's OS X, or the like.

Applications 730 may include processor executable instructions which, when executed by node 700, transmit, receive, and/or otherwise process messages, audio, video, and enable communication with other networked computing devices. Examples of application programs include database servers, file servers, calendars, transcoders, and so forth. Applications 730 may include, for example, file system application 734, and add/remove/modify point-in-time snapshot functionality application 732 according to implementations of this disclosure. For example, an application to add a flag for a file or object that determines whether a point-in-time snapshot created for the file should be retained. It can be appreciated that a UI for such application can exists, such as within a web UI for the distributed file system as a whole.

Human interface components (not pictured), may be remotely associated with node 700, which can enable remote input to and/or output from node 700. For example, information to a display or from a keyboard can be routed through the input/output interface 740 to appropriate peripheral human interface components that are remotely located. Examples of peripheral human interface components include, but are not limited to, an audio interface, a display, keypad, pointing device, touch interface, and the like.

Data storage 720 may reside within memory 710 as well, storing file storage 722 data such as metadata or LIN data and multi-protocol redirection table 724 as disclosed herein, and point-in-time snapshot retention data 726 that can be used to establish retention settings for objects and files as disclosed above. It can be appreciated that LIN data and/or metadata can relate to rile storage within processor readable stationary storage 750 and/or processor readable removable storage 760. For example, LIN data may be cached in memory 710 for faster or more efficient frequent access versus being stored within processor readable stationary storage 750.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:
1. A computer implemented method comprising:
Maintaining a distributed file system on a cluster of nodes, wherein the distributed file system is accessible by clients using a plurality of network protocols;
Receiving a read request from a client using the Hadoop Distributed File System ("HDFS) protocol wherein the read request is associated with a read target;
In response to receiving the read request, dynamically generating a point-in-time snapshot of the read target, wherein the point-in-time snapshot is associated with a set of pseudo DataNode locations and wherein the set of pseudo DataNode locations are associated with a set of block location addresses within the distributed file system; and Sending the client the set of pseudo DataNode locations associated with the point-in-time snapshot.

2. The method of claim 1, further comprising:

retaining the point-in-time snapshot as a version of the read target.

3. The method of claim 1, further comprising:

releasing for other use at least some of the set of pseudo DataNode locations associated with the point-in-time snapshot based on a versioning flag associated with the read target.

4. The method of claim 1, wherein the dynamically generating the point-in-time snapshot occurs while a Network File System ("NFS") client is accessing and modifying the read target.

5. The method of claim 4, wherein the NFS client is accessing the cluster of nodes from a different node than the client.

6. The method of claim 1, wherein the dynamically generating the point-in-time snapshot occurs while a Server Message Block ("SMB") client is accessing and modifying the read target.

7. A system comprising at least one storage device and at least one hardware processor configured to:

Maintain a distributed file system on a cluster of nodes, wherein the distributed file system is accessible by clients using a plurality of network protocols;

Receive a read request from a client using the Hadoop Distributed File System ("HDFS) protocol wherein the read request is associated with a read target;

In response to receiving the read request, dynamically generate a point-in-time snapshot of the read target, wherein the point-in-time snapshot is associated with a set of pseudo DataNode locations and wherein the set of pseudo DataNode locations are associated with a set of block location addresses within the distributed file system; and Send the client the set of pseudo DataNode locations associated with the point-in-time snapshot.

8. The system of claim 7 further configured to:

retain the point-in-time snapshot as a version of the read target.

9. The system of claim 7 further configured to:

release for other use at least some of the set of pseudo DataNode locations associated with the point-in-time snapshot based on a versioning flag associated with the read target.

10. The system of claim 7, wherein the dynamically generating the point-in-time snapshot occurs while a Server Message Block ("SMB") client is accessing and modifying the read target.

11. The method of claim 10, wherein the SMB client is accessing the cluster of nodes from a different node than the client.

12. The method of claim 7, wherein the dynamically generating the point-in-time snapshot occurs while a Network File System ("NFS") client is accessing and modifying the read target.

13. A non-transitory computer readable medium with program instructions stored thereon executed on a processor to perform the following acts:

Maintaining a distributed file system on a cluster of nodes, wherein the distributed file system is accessible by clients using a plurality of network protocols;

Receiving a read request from a client using the Hadoop Distributed File System ("HDFS) protocol wherein the read request is associated with a read target;

In response to receiving the read request, dynamically generating a point-in-time snapshot of the read target, wherein the point-in-time snapshot is associated with a set of pseudo DataNode locations and wherein the set of pseudo DataNode locations are associated with a set of block location addresses within the distributed file system; and Sending the client the set of pseudo DataNode locations associated with the point-in-time snapshot.

14. The non-transitory computer readable medium of claim 13, with program instructions stored thereon to further perform the following acts:

retaining the point-in-time snapshot as a version of the read target.

15. The non-transitory computer readable medium of claim 13, with program instructions stored thereon to further perform the following acts:

releasing for other use at least some of the set of pseudo DataNode locations associated with the point-in-time snapshot based on a versioning flag associated with the read target.

16. The non-transitory computer readable medium of claim 13, wherein the dynamically generating the point-in-time snapshot occurs while a Network File System ("NFS") client is accessing and modifying the read target.

17. The non-transitory computer readable medium of claim 16, wherein the NFS client is accessing the cluster of nodes from a different node than the client.

18. The non-transitory computer readable medium of claim 13, wherein the dynamically generating the point-in-time snapshot occurs while a Server Message Block ("SMB") client is accessing and modifying the read target.

* * * * *